United States Patent Office 2,729,571
Patented Jan. 3, 1956

2,729,571

NITROCELLULOSE COATING COMPOSITIONS

John D. Brandner and Robert H. Hunter, Wilmington, Del., assignors to Atlas Powder Company, Wilmington, Del., a corporation of Delaware No Drawing. Application September 18, 1950, Serial No. 185,510

1 Claim. (Cl. 106—173)

This invention relates to coating compositions and more particularly to coating compositions containing plasticized nitrocellulose.

It is an object of the invention to provide novel plasticized compositions of nitrocellulose useful in a wide variety of protective, decorative and adhesive coatings.

A further object is to provide plasticized compositions of nitrocellulose compounded with various synthetic and natural resins for coatings.

The above and other objects will become apparent in the course of the following description and the appended claim.

Compositions fulfilling the above objects comprise nitrocellulose and plasticizers not heretofore disclosed for use in conjunction with nitrocellulose. Also comprehended are compositions containing, in addition to the nitrocellulose and novel plasticizers, synthetic resins, natural resins and gums, pigments, auxiliary plasticizers to modify the properties of the coatings in manner well known to the art. Also included within the purview of the invention are solutions of the coating compositions in solvents to form lacquers, cloth coating dopes, and the like.

The nitrocellulose component of the compositions of the present invention may be any of the so-called "soluble" grades and types of commerce. The soluble nitrocelluloses range in nitrogen content from about 10.7% to about 12.2% and in viscosity from less than ¼ second to upwards of several hundred seconds. The selection of an appropriate nitrocellulose for a particular composition will be governed, as is understood by those skilled in the art, by considerations of the purpose of the coating, the method of application intended, the solvent composition to be employed, and the like.

Plasticizers of the novel compositions comprise phenoxyethyl and phenoxypropyl esters of lauric acid, oleic acid, and tall oil; and may be represented generically by the formula

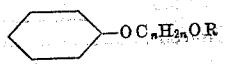

wherein $n$ is a whole number from 2 to 3 and R represents the acyl radical of an acid selected from the group consisting of lauric acid, oleic acid and tall oil. These compounds may be prepared by the direct esterification of phenoxyethanol with the appropriate acid as taught in our copending applications Ser. No. 182,122, now Patent Number 2,687,970, and 182,124, both filed August 29, 1950. It will be readily appreciated that the plasticizers need not be chemically pure compounds but may comprise the esters of commercial grades of acids, and of acid mixtures obtained by hydrolysis of naturally occurring glycerides in which the named acids predominate.

The proportion of cellulose nitrate to plasticizer in the compositions of the invention may vary depending upon the presence or absence of added resins and upon the properties desired in the coating or finished composition. Compositions containing as little as 0.1 part plasticizer and as much as 2 or even more parts of plasticizer per part of nitrocellulose may be employed to give useful compositions although it is preferred to employ from 0.25 to 1.0 part plasticizer per part of nitrocellulose.

The wide range of modifying components which may be employed in coating compositions containing nitrocellulose and the novel plasticizers for nitrocellulose herein disclosed is illustrated in the examples which follow. Nitrocellulose coatings are almost universally applied from solution and the formulas of the examples include solvents to produce compositions suitable for application to the product to be coated. Equally within the scope of our invention are the coatings resulting from the evaporation of the solvents after application. The examples presented are illustrative only and the invention is not to be construed as limited to the particular compositions of the examples. In the examples all parts are by weight unless otherwise indicated.

Example I

A composition suitable for coating metal foils and for use as a heat sensitive adhesive comprises the following:

12 parts nitrocellulose RS, 5 to 6 seconds viscosity
6 parts phenoxyethyl tall oil ester
40 parts xylol
6 parts ethyl alcohol
12 parts butyl alcohol
24 parts butyl acetate This lacquer produces a film of good flexibility and excellent adhesion. It may be used for laminating foil to wax paper and the like by virtue of its heat sensitive character.

Example II

A composition suitable either as a clear coating for fabrics or as a base to be pigmented for coating fabrics to form artificial leather is the following:

10 parts nitrocellulose RS, 20 to 30 seconds viscosity
10 parts AA castor oil
10 parts phenoxyethyl oleate
35 parts toluene
17.5 parts ethyl alcohol
17.5 parts methyl ethyl ketone

Example III

The plasticizers of the present invention are excellent grinding media for pigments and may be used to form pastes suitable for coloring the cloth dope of Example II or other lacquers. Such a paste may comprise:

70 parts chrome yellow
30 parts phenoxyethyl tall oil ester

Premix roughly and subject to a single pass through a 3-roll mill. Addition of 2 pounds of the resulting paste per gallon of the product of Example II forms a pigmented coating for fabrics suitable for the production of artificial leather.

Example IV

A finish suitable as a protective and decorative coating for leather is the following:

10 parts nitrocellulose RS, 125 seconds viscosity
15 parts blown castor oil
10 parts phenoxyethyl oleate
30 parts toluol
15 parts ethyl alcohol
20 parts ethyl acetate A colored coating employing the same base may be prepared by adding 2 pounds of the product of Example III per gallon of the above.

Example V

A lacquer emulsion in which the nitrocellulose is plasticized in accordance with the present invention is the following:

Lacquer phase—

20 parts nitrocellulose RS, ¼ second viscosity
10 parts phenoxyethyl tall oil ester
2 parts polyoxyethylene sorbitan monolaurate
10 parts ethyl alcohol
5 parts butyl alcohol
15 parts methyl-isobutyl ketone
5 parts xylol Water phase—

0.2 part polyoxyethylene sorbitan monolaurate
32.8 parts water

Prepare the phases separately and add the lacquer phase to the aqueous phase under vigorous agitation to produce a lacquer emulsion suitable for coating leather, stiffening cloth, or water-proofing masonry and other porous structures.

Example VI

A wood lacquer of good cold check resistance, excellent print resistance, excellent gloss, and outstanding alcohol resistance is the following:

10 parts nitrocellulose RS, ½ second viscosity
10 parts maleic modified ester gum, M. P. 140°
10 parts phenoxyethyl tall oil ester
35 parts toluol
5 parts ethyl alcohol
10 parts butyl acetate
10 parts methyl-isobutyl ketone
10 parts butyl alcohol

Example VII

A flexible, water resistant coating for paper may be applied from the following formula:

15 parts nitrocellulose RS, ½ second viscosity
5 parts ester gum
3 parts phenoxypropyl laurate
15 parts ethyl alcohol
15 parts ethyl acetate
47 parts toluol

Example VIII

A metal lacquer of spraying consistence suitable for use on steel as a corrosion resistant coating is:

8 parts nitrocellulose RS, 5–6 seconds viscosity
8 parts coconut oil modified alkyd resin
4 parts phenoxyethyl laurate
20 parts toluol
4 parts ethyl alcohol
20 parts xylol
16 parts methyl ethyl ketone
20 parts butyl acetate

Example IX

A high grade wood lacquer for furniture and cabinet work is composed as follows:

9 parts nitrocellulose RS, ¼ second viscosity
5.4 parts maleic modified ester gum
8.1 parts castor oil modified alkyd
2 parts dioctyl phthalate
2.5 parts phenoxyethyl tall oil ester
10 parts ethyl alcohol
35 parts toluol
10 parts butyl acetate
10 parts methyl-isobutyl ketone
8 parts butyl acetate

Example X

A sealing composition for wood or other porous substances, to be used under lacquer or other finish is the following:

10 parts nitrocellulose SS, ¼ second viscosity
10 parts alcohol soluble maleic modified ester gum
5 parts phenoxyethyl tall oil ester
40 parts ethyl alcohol
10 parts ethyl alcohol
10 parts ethyl acetate
5 parts ethoxyehanol
10 parts toluol

Example XI

A lacquer formulation producing coatings of good adhesion which may be rubbed to a high gloss is as follows:

7.5 parts nitrocellulose RS, 5 seconds viscosity
7.5 parts dewaxed dammar (solids)
2.5 parts phenoxypropyl oleate
15 parts ethyl alcohol
35 parts xylol
10 parts ethyl acetate
22.5 parts butyl acetate The novel plasticizers herein disclosed produce nitrocellulose compositions exhibiting in high degree a combination of advantageous properties not heretofore conferred by single plasticizers. The new plasticizers contribute to excellence in cold check resistance, print resistance, adhesion, flexibility, and non-volatility.

What is claimed is:

A nitrocellulose lacquer, the solids of which consist essentially of one part by weight soluble nitrocellulose containing from about 10.7% to about 12.2% nitrogen; from about 0.25 to about 1.0 part of phenoxyethyl tall oil ester as plasticizer; and from 0 to about 5 parts of a modifying resin.

References Cited in the file of this patent

UNITED STATES PATENTS

| | | |
|---|---|---|
| 1,676,612 | Kramer | July 10, 1928 |
| 2,098,540 | Charch | Nov. 9, 1937 |